(12) United States Patent
Hurson et al.

(10) Patent No.: US 10,944,660 B2
(45) Date of Patent: Mar. 9, 2021

(54) MANAGING CONGESTION IN A NETWORK

(71) Applicant: Intel Corporation, Santa Clara, CA (US)

(72) Inventors: Tony Hurson, Austin, TX (US); Simoni Ben-Michael, Givat Zeev (IL); Ben-Zion Friedman, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/517,408

(22) Filed: Jul. 19, 2019

(65) Prior Publication Data

US 2019/0342199 A1 Nov. 7, 2019

Related U.S. Application Data

(60) Provisional application No. 62/802,949, filed on Feb. 8, 2019.

(51) Int. Cl.
*H04L 12/26* (2006.01)
*H04L 29/08* (2006.01)
*H04L 12/801* (2013.01)
*H04L 12/863* (2013.01)

(52) U.S. Cl.
CPC ........ *H04L 43/0882* (2013.01); *H04L 47/193* (2013.01); *H04L 47/35* (2013.01); *H04L 47/626* (2013.01); *H04L 67/1097* (2013.01)

(58) Field of Classification Search
CPC ............. H04L 43/0882; H04L 67/1097; H04L 47/193; H04L 47/626; H04L 47/35;
(Continued)

(56) References Cited

U.S. PATENT DOCUMENTS

2005/0147032 A1* 7/2005 Lyon .................... H04L 49/501
370/229
2013/0135999 A1 5/2013 Bloch et al.
(Continued)

FOREIGN PATENT DOCUMENTS

WO 2017215392 A1 12/2017

OTHER PUBLICATIONS

Diego Crupnicoff et al., "Deploying Quality of Service and Congestion Control in InfiniBand-based Data Center Networks", White Paper, Mellanox Technologies Inc., Rev 1.0, Nov. 2005, 19 pages.
(Continued)

*Primary Examiner* — Tu T Nguyen
(74) *Attorney, Agent, or Firm* — Compass IP Law PC

(57) ABSTRACT

Examples described herein include configuration of a transmitting network device to identify a source queue-pair identifier in at least some of the packets that are transmitted to an endpoint destination. A network device that receives packets and experiences congestion can determine if a congestion causing packet includes a source queue-pair identifier. If the congestion causing packet includes a source queue-pair identifier, the network device can form and transmit a congestion notification message with a copy of the source queue-pair identifier to the transmitting network device. The transmitting network device can access a context for the congestion causing packet using the source queue-pair identifier without having to perform a lookup to identify the context.

21 Claims, 12 Drawing Sheets

(58) Field of Classification Search
CPC ......... H04L 47/26; H04L 69/22; H04L 69/16; H04L 43/0894; H04L 43/16; H04L 43/0876
USPC .......................................................... 709/224
See application file for complete search history.

(56) References Cited

U.S. PATENT DOCUMENTS

2018/0198715 A1* 7/2018 Shmilovici ........... H04L 47/127
2020/0021532 A1* 1/2020 Borikar ................. H04L 49/90

OTHER PUBLICATIONS

Dimitri Bertsekas et al., "Flow Control", Second Edition, Data Networks, Chapter 6, Massachusetts Institute of Technology, 1992-1987 by Prentice Hall, Englewood Cliffs, New Jersey, ISBN 0-13-200916-1, pp. 493-536.

Knowledge Article, "Understanding RoCEv2 Congestion Management", https://community.mellanox.com/s/article/understanding-rocev2-congestion-management, Dec. 3, 2018, 9 pages.

Mark Allman et al., "TCP Congestion Control", Purdue University, IETF Trust, Sep. 2009, 20 pages.

Matt Hayes, "What is a Network Traffic Flow?", Bits 'n Bytes, An I.T. Architect's Journeys with Computing, Sep. 26, 2018, https://mattjhayes.com/2018/09/26/what-is-a-network-traffic-flow/, 10 pages.

Pankaj Gupta et al., "Algorithms for Packet Classification", Computer Systems Laboratory, Stanford University, Stanford, CA, IEEE Networks, Mar./Apr. 2001, 29 pages.

Srinivasan Keshav, "Packet-Pair Flow Control", AT&T Bell Laboratories, New Jersey, USA, IEEE/ACM Transactions on Networking, 1995, 45 pages.

Extended European Search Report for Patent Application No. 20155481.3, dated Apr. 20, 2020, 13 pages.

* cited by examiner

MANAGING CONGESTION IN A NETWORK

RELATED APPLICATION

The present application claims the benefit of priority date of U.S. provisional patent application Ser. No. 62/802,949, filed Feb. 8, 2019, the entire disclosure of which is incorporated herein by reference.

TECHNICAL FIELD

Various examples described herein relate to managing congestion in a network.

BACKGROUND

Data centers provide vast processing, storage, and networking resources to users. For example, smart phones or internet of things (IoT) devices can leverage data centers to perform data analysis, data storage, or data retrieval. Data centers are typically connected together using high speed networking devices such as network interfaces, switches, or routers. Congestion can occur whereby a receive port or queue used by a data center receives more traffic than it can transfer for processing and the port or queue overflows. Identifying a cause of congestion can be time consuming and lead to slow resolution of congestion.

DETAILED DESCRIPTION

Figure 1:
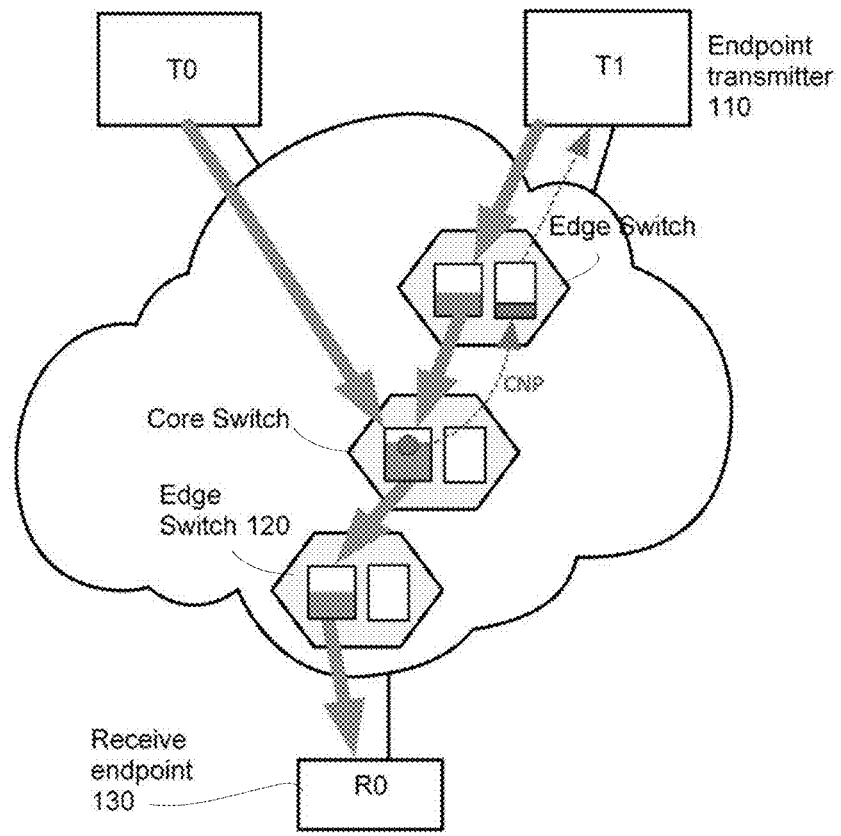
FIG. 1 depicts an example network.

In Ethernet compatible networks that use remote direct memory access (RDMA) over Converged Ethernet (RoCE) v2, a congested point (e.g., endpoint, edge, or core switch device) can send a congestion notification packet (CNP) directly or indirectly to the transmitter end point (reaction point) to reduce its transmit rate and alleviate the congestion situation. For example, RoCE v2 is described at least in Annex A17: RoCEv2 (2014). In this CNP, the congested point will specify the source point to be rate controlled or rate limited (assuming each end point has many sources from its many different applications sending packets to many other destinations). The CNP can ask for rate limiting of all the sources (flows) transmitting through a last hop switch to an end node. The congested point could use the source Internet Protocol (IP) address of the packet (among other packets) that created the congestion at the destination and route the CNP to the source end point originating the packet flow that caused or is attributed to the congestion, with an instruction to reduce its rate.

A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. In some examples, for a destination QP, there can be more than 256,000 different flows or QPs. In order to map those tuples to a flow, there is a need for a large lookup table for use to lookup the flow by these tuples. Searching such a big lookup tables adds more complexity to the design of a network interface or switch and increases time to reacting to the congestion.

Identifying a flow or a queue-pair (QP) that is a potential cause of congestion so that the flow or QP can be rate controlled involves the action of searching a very large lookup table. This lookup table in some cases cannot be entirely stored on chip, so it is stored either in host memory or on side dynamic random access memory (DRAM). On chip, there could be a cache for recently used flows. When a search miss on that cache happens, the device needs to bring the missing table entry from external memory (e.g., host memory or DRAM) and evict an entry to make room for it. This overall process is expensive in time used and complexity of design.

Enlarging a reaction time because of the use of a complex big table lookup will enlarge the loop latency (i.e., the time from when a congestion was identified to a time when an action to deal with congestion has been taken place). A larger reaction time can reduce the effectiveness of the rate limiting process and could deteriorate network overall performance (e.g., throughput, average latency).

One possible lookup operation could involve use of the CNP packet's source IP and destination QP number, assuming the switch or sender of the CNP packet used the destination IP address of the packet identified to cause the congestion as the CNP source IP address and used the source IP address as the destination IP of the CNP packet so that the CNP packet will eventually reach the end point that transmitted that sampled packet.

In some embodiments, at formation of a connection involving endpoint devices, source and destination QP identifiers can be determined. An endpoint transmitter can store the source QP identifier and use the source QP in transmitted packets. Various embodiments provide for a source transmitter to provide the source QP number or identifier in at least some of its transmitted packets. For example, transmitted packets can periodically include a source QP identifier according to a timer. In response to detection of congestion, various embodiments provide for use of a RoCE v2 compatible CNP's UDP source port field (or other field or preamble) to indicate the originating QP number (source QP) associated with the congestion. In some cases, a TCP source port field of a packet that is used to identify congestion can include a source QP identifier. By contrast, currently, transmitted RoCE v2 packets specify the destination QP number but do not specify the source QP number. When the RoCEv2 compatible packet causes a congestion, the switch or network device will extract a source QP number from the packet that causes congestion, place the source QP number in the CNP packet's UDP Source Port field (or other field) and send the CNP to the source transmitter (source of the congestion causing packet(s)).

According to some embodiments, the congestion point (e.g., switch, either the last hop switch or any core switch or end receiving node), can extract the QP number stored in the packet causing the congestion and embed it in a CNP packet's UDP source port field, TCP source port field, or other field or preamble. The source transmitter can determine which QP needs to have its transmit bandwidth adjusted using the specified source QP without any additional lookup to identify a source QP. The source or originating transmitter end node receives the CNP packet, extracts this QP number, and uses the QP number to perform a look-up of transmit rate and can immediately rate control the flow or QP causing the congestion at the congestion point (e.g., the switch or end node receiving).

Various embodiments can reduce reaction time to congestion by eliminating the complex big table lookup to determine a source QP, thereby enabling a shorter reaction time, reducing the loop latency (e.g., the time from a congestion was identified to when action to deal with it has been taken place), and enhancing network overall performance (e.g., throughput and reducing average latency).

FIG. 1 depicts an example network. In this example network, there are endpoint transmitter nodes (T0 and T1), edge and core switches, and a receiver node (R0). Network devices can be any of switch buffers, packet buffers, routers, network interfaces, or switches or combination thereof. The network can be compatible with any one or more of: Intel QuickPath Interconnect (QPI), Intel Ultra Path Interconnect (UPI), Intel On-Chip System Fabric (IOSF), Omnipath, Ethernet, InfiniB and, Compute Express Link (CXL), HyperTransport, high-speed fabric, PCIe, NVLink, Advanced Microcontroller Bus Architecture (AMBA) interconnect, OpenCAPI, GenZ, CCIX, NVMe over Fabrics (NVMe-oF) (described at least in NVM Express Base Specification Revision 1.4 (2019)), and variations thereof, and so forth. A software-defined network (SDN) controller or orchestrator can be used to program paths of flows through the network.

A congestion scenario is shown in this example whereby a core switch has experienced congestion. Congestion can be found based on one or more of: overflow of packets at an ingress port, overflow of packets at an ingress queue, overflow of packets at an egress queue, overflow of packets at an egress port, incast level exceeding a threshold (e.g., more traffic to egress port than egress port can handle), packet drop rate in a transmit pipeline such as egress queues or intermediate queues that feed egress queues, bandwidth limits, queue depth exceeded. The core switch that experiences congestion forms a CNP and transmits the CNP to an endpoint transmitter 110 (T1) through an edge switch.

In this example, a RoCE protocol can be used by the core switch, edge switch, and endpoint transmitter to transmit the CNP to endpoint transmitter 110. The CNP includes an identification of a source of a packet that caused congestion. In accordance with various embodiments, the CNP can include an identifier of a source queue-pair (QP) associated with the congestion at the core switch in a UDP source port field of the CNP. In some embodiments, instead of use of UDP source port field to include an identifier of a source QP identifier, a TCP source port field of a CNP can be used to provide a source QP to endpoint transmitter 110.

Note that protocols other than RoCE can be used to transmit source queue-pair information such as Internet Wide Area RDMA Protocol (iWARP), quick UDP Internet Connections (QUIC), InfiniBand, and others.

Other optional fields in a RoCE compatible packet can be used to convey the source QP identifier in a transmitted packets. In other examples, source QP identifier can be provided in the optional fields of Internet Protocol (IP) headers such as in IPv4 Options field, or in an IPv6 Extended Header. In some examples, a preamble can be used to convey a source QP identifier. In some examples, the source QP identifier can be an encoded value that is a smaller size than the original source QP identifier and decoded by endpoint transmitter 110 using a decoding scheme.

A queue-pair can be established between endpoint transmitter 110 and receive endpoint 130 using a send queue and receive queue pair using remote direct memory access (RDMA) and can be a socket-like connection between endpoints. Endpoint transmitter 110 can form RoCE connection with other nodes by at least specifying a template header. The template header can include all invariant fields throughout life of connection, per queue-pair. Endpoint transmitter 110 can configure the template header so that all devices are configured to recognize a UDP source port (or other field or preamble) contains a source queue-pair identifier. Endpoint transmitter 110 transmits packets that include a source queue-pair identifier in a UDP source port field (or other fields).

Figure 2A:
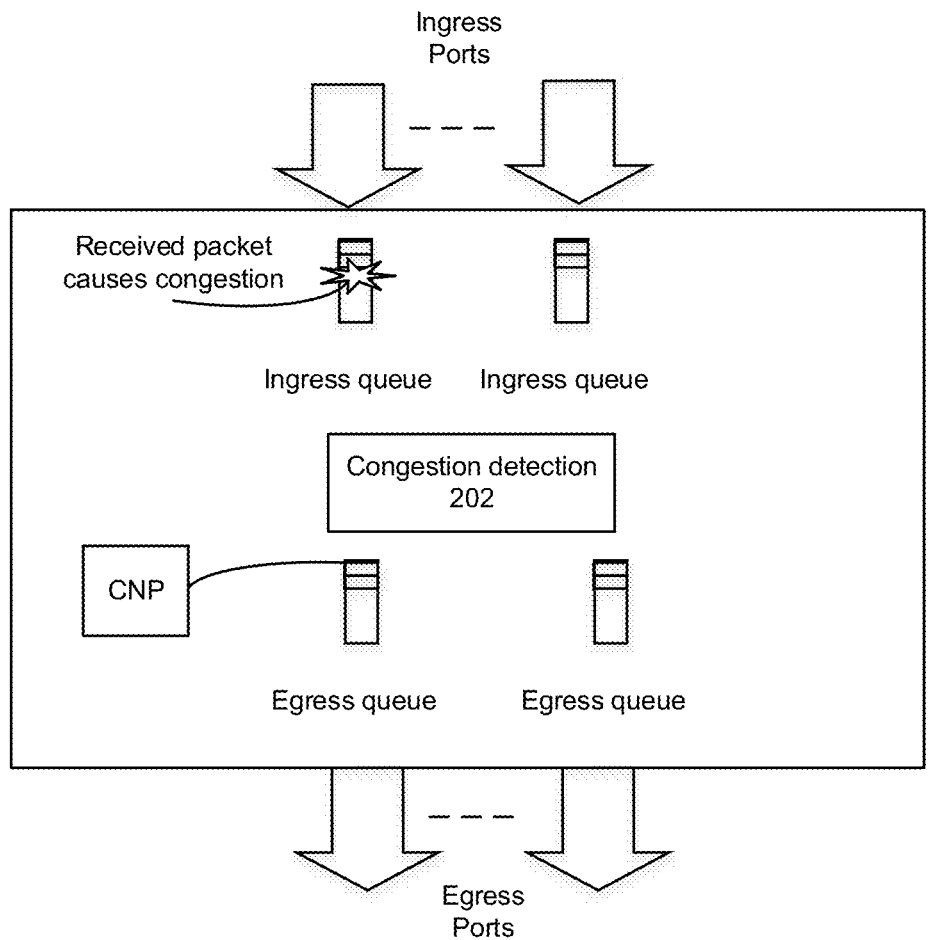
FIG. 2A depicts a simplified diagram of a switch element.

FIG. 2A depicts a simplified diagram of a switch element. A switch element can include multiple ingress ports and multiple egress ports. An input queue can be used to identify one or more packets received from a network (e.g., another switch element or a transmitter) via an ingress port. An output queue can identify one or more packets to be transmitted to a network (e.g., another switch element or a receiver) using an egress port.

Congestion detection element 202 can determine that an ingress queue or an egress queue has a fill level that is too high (e.g., at or above a threshold) and identify a congestion-causing packet that caused a fill level of a queue to meet or exceed a threshold. Other types of congestion can be identified. The congestion-causing packet could be used to identify an endpoint transmitter that transmitted the congestion-causing packet for example using a source IP address and source MAC address specified in the congestion-causing packet. In response to detecting congestion, congestion detection element 202 could cause a CNP to be formed. A source transmitter can provide the QP source number or identifier in at least some packets transmitted using an RoCEv2 compatible packet's UDP source port field (or other location).

When the RoCEv2 compatible packet causes a congestion, congestion detection element 202 will extract a source QP identifier from the packet that causes congestion, place the source QP identifier in the CNP packet's UDP Source Port field and cause transmission of the CNP to the source transmitter. In some embodiments, the source QP identifier can be stored in a 16 bit field or other sizes. The CNP can be formed to include a source QP identifier of a packet associated with a queue that caused the queue to meet or exceed a fill level considered congested.

The switch forms a CNP from the congestion causing packet by reversing the congestion-causing packet's source and destination MAC addresses and source and destination IP addresses, such that the destination address of the CNP is the source address of the congestion causing packet and the destination MAC address in the CNP is the source address of the congestion causing packet. According to some embodiments, the CNP can be RoCEv2compatible and include a RoCE base transport header (BTH) with an op code indicating itself as a CNP packet. The switch can transmit the CNP with extracted source QP identifier to an endpoint transmitter identified as a sender of the congestion-causing packet.

Figure 2B:
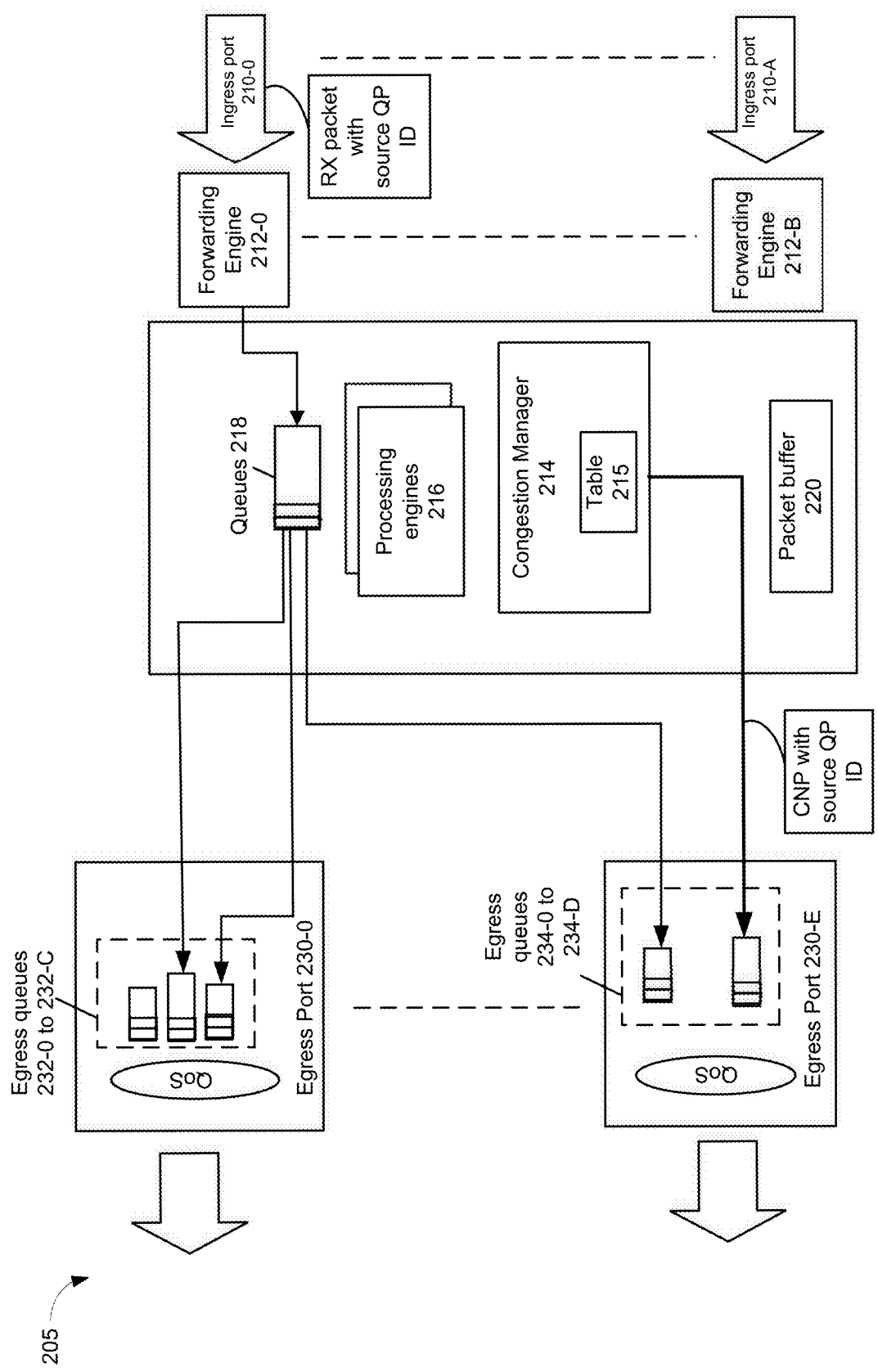
FIG. 2B depicts an example network device.

FIG. 2B depicts an example network device. System 205 can be used by any network device to provide for detection of congestion and formation of a congestion notification message.

Ingress ports 210-0 to 210-A can receive packets from a network, fabric, interconnect, or any wired or wireless network medium. Packets can be compatible with Ethernet, InfiniB and, or any public or proprietary standard. Ingress ports 210-0 to 210-A can have an associated forwarding engine 212-0 to 212-B. Forwarding engines 212-0 to 212-B can determine an egress port 230-0 to 230-E to use to egress a received packet. For example, forwarding engine 212-0 can forward a packet received at ingress port 210-0 to egress port 230-E based on a flow or traffic class associated with a packet. For example, a flow can be identified by one or more of: a destination port, a destination IP address, a destination port, a destination IP address, or any other packet header, preamble, or payload contents.

Packet buffer 220 can be a region of memory that is allocated to store header and/or payload portions of packets received from forwarding engines 212-0 to 212-B. In some examples, queues 218 can store pointers to portions of packets in packet buffer 220. To egress a packet to a port, a pointer or packet can be transferred to an egress queue associated with an egress port. For example, egress ports 230-0 to 230-E can have one or more associated egress packet queues 232-0 to 232-C or 234-0 to 234-D. An egress packet queue can be associated with a quality of service (QoS) for example and transmission from the egress packet queue is provisioned based on QoS requirements for a packet flow or traffic class.

Processing engines 216 can process packets in queues 218 and determine an egress queue (e.g., 232-0 to 232-C or 234-0 to 234-D) to use to egress packets. Packet processing can include any of decryption, selective packet dropping, flow determination, determination of next network device address, encryption, error checking, and so forth.

Congestion manager 214 can identify congestion and a source of congestion. For example, congestion can be found based on one or more of: overflow of packets at an ingress port, overflow of packets at an ingress queue, overflow of packets at an egress queue, overflow of packets at an egress port, incast level exceeding a threshold (e.g., more traffic to egress port than egress port can handle), packet drop rate in a transmit pipeline such as egress queues or intermediate queues that feed egress queues, bandwidth limits, or queue depth exceeded. In some embodiments, congestion manager 214 can determine congestion occurring at any of ingress ports 210-0 to 210-A, queues 218, packet buffer 220, egress queues 232-0 to 232-C, egress queues 234-0 to 234-D, or egress ports 230-0 to 230-E.

In some embodiments, congestion manager 214 can detect a packet that caused congestion. If the packet that caused congestion specifies a source QP ID, congestion manager 214 can copy the source QP ID, form a CNP with the source QP ID, and cause transmission of the CNP with the source QP ID to a source transmitter of the congestion causing packet. However, if the congestion causing packet does not specify a source QP ID, congestion manager 214 can access table 215 to determine the source QP ID based on contents of the congestion causing packet such as destination QP ID, or other fields, header, preamble, or payload contents. Table 215 can include entries identifying a source QP ID based on destination QP ID, or other fields, header, preamble, or payload contents of packets. Congestion manager 214 can provide the looked-up source QP ID in the CNP. Accordingly, if the congestion packet includes a source QP ID, congestion manager 214 can avoid looking up the source QP ID using a table 215.

Figure 3A:
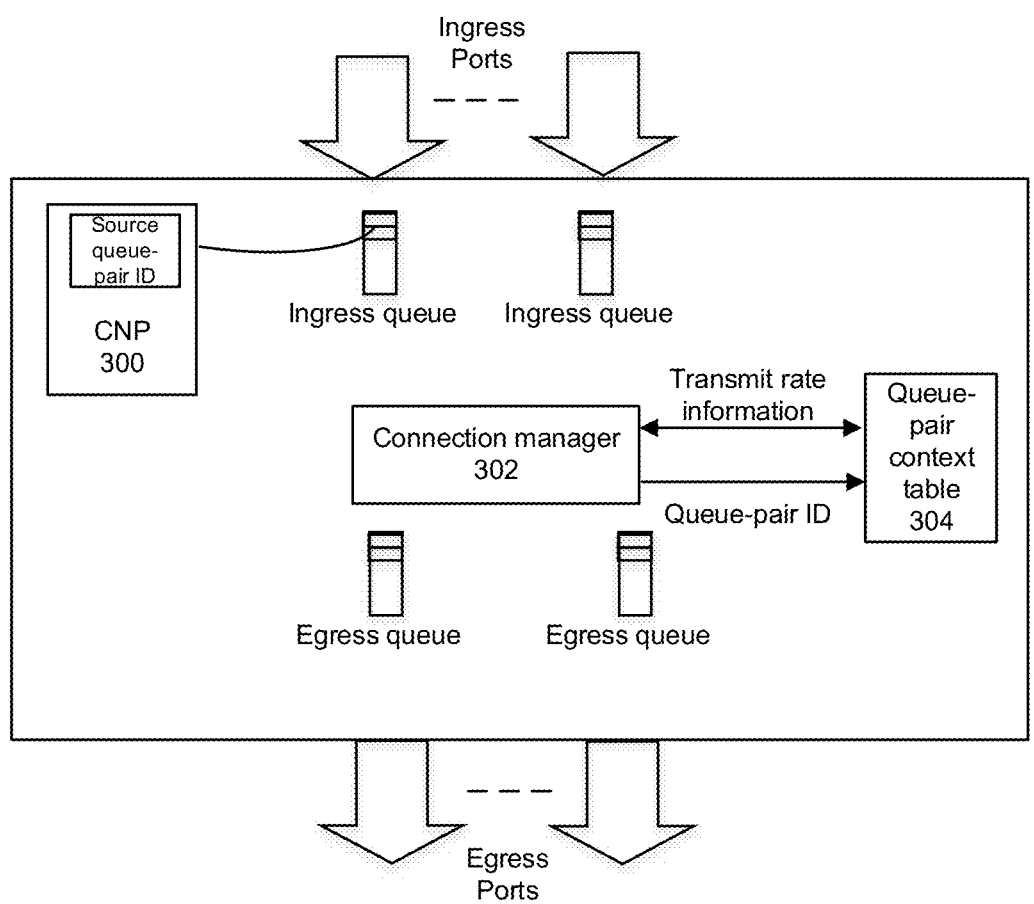
FIG. 3A depicts an example simplified block diagram of an endpoint transmitter.

FIG. 3A depicts an example simplified block diagram of an endpoint transmitter. The transmitter endpoint receives a packet at an ingress port. In some examples, the received packet is a CNP and connection manager 302 identifies the received packet as a CNP based on an operation code in its header. In some embodiments, connection manager 302 determines that a CNP 300 is received and identifies a source QP identifier from the UDP or TCP source port field (or other field) of CNP 300 to identify a source QP of a congestion causing packet. The source QP can be used as an index to a look-up table to find a connection queue-pair context from queue-pair context table 304. For example, a queue-pair context can include one or more of: a transmit bit rate, explicit bit rate (Mbps), inter-packet gap (time gap between transmitted packets), transmit packet sequence number, receive packet sequence number, and other values. The transmitter endpoint can slow down or speed up transmit bit rate associated with a queue-pair context and update its queue-pair context table 304 with a new transmit bit rate. In some examples, receipt of a message identifying a source QP associated with congestion can cause the transmitter endpoint to reduce a transmit rate for the QP.

In some embodiments, a first received CNP 300 for a QP can cause the transmit bandwidth for the QP to decrease by a set percentage without specification of a transmit rate. Some CNP 300 can cause the transmit rate to increase by a set percentage without specification of a transmit rate. In some embodiments, data center quantized congestion notification (DCQCN) can be used to program a transmitter as to an extent of transmit rate increase or decrease in response to receipt of a CNP.

In some embodiments, CNP 300 can specify an inter-packet transmit gap in order to adjust a transmit rate for a QP. For example, a larger inter-packet transmit gap can reduce transmit rate for the QP whereas a smaller inter-packet transmit gap can increase transmit rate for the QP. Some CNP 300 can be used to indicate congestion is no longer detected at a network device that previously indicated congestion in order to cause the endpoint transmitter to recover its transmit bit rate to a maximum permitted rate or to a higher transmit rate.

In some examples, endpoint transmitter transmits packets using one or more egress ports. One or more egress queues can be used to identify packets that are to be transmitted from an egress port.

Figure 3B:
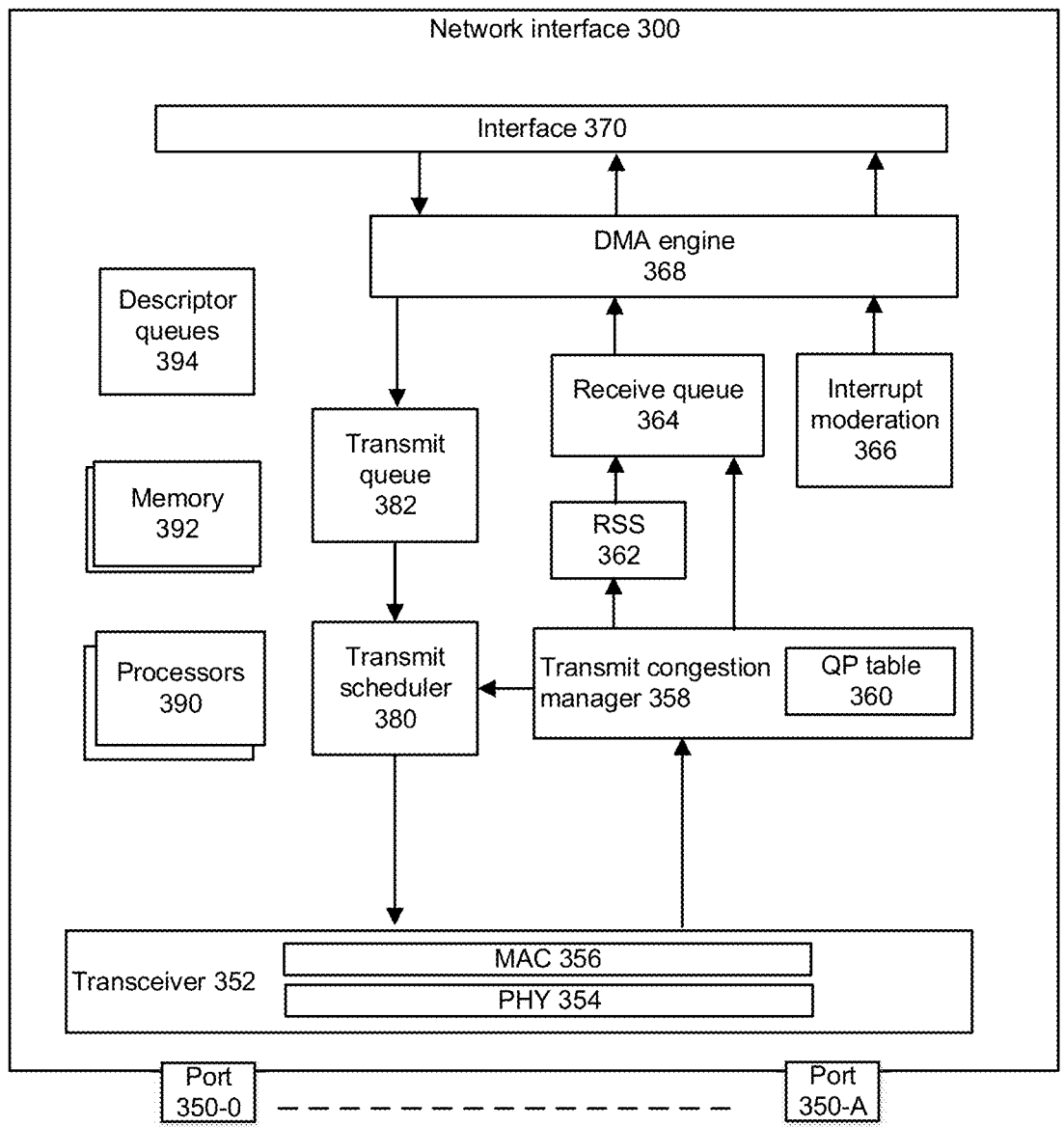
FIG. 3B depicts an example network device.

FIG. 3B depicts an example network device. Transceiver 352 can be capable of receiving and transmitting packets using any of ports 350-0 to 350-A in conformance with the applicable protocols such as Ethernet as described in IEEE 802.3—2018, although other protocols may be used. Transceiver 352 can receive and transmit packets from and to a network via a network medium (not depicted). Transceiver 352 can include PHY circuitry 354 and media access control (MAC) circuitry 356. PHY circuitry 354 can include encoding and decoding circuitry (not shown) to encode and decode data packets according to applicable physical layer specifications or standards. MAC circuitry 356 can be configured to assemble data to be transmitted into packets, that include destination and source addresses along with network control information and error detection hash values. MAC circuitry 356 can be configured to process MAC headers of received packets by verifying data integrity, removing preambles and padding, and providing packet content for processing by higher layers.

Transmit congestion manager 358 can at least identify CNPs or other congestion indicators in received packets. If a CNP or other congestion indicator or message includes a source QP ID, transmit congestion manager 358 can use the source QP ID to look-up queue context for the QP from QP table 360. If a CNP or other congestion indicator or message does not include a source QP ID, transmit congestion manager 358 can perform a lookup operation to identify a source QP ID and/or context for a congestion causing QP using a destination QP identifier and in some cases, a portion of a received packet header (e.g., Ethernet type field, source and/or destination IP address, source and/or destination User Datagram Protocol (UDP) ports, source/destination TCP ports, or any other header field). Transmit congestion manager 358 can adjust a transmit rate up or down based on an inter-packet gap specified in the received CNP or other congestion indicator or message. For example, to adjust a transmit rate, transmit congestion manager 358 can configure transmit scheduler 380 to adjust its egress rate of packets in transmit queue 382. Transmit congestion manager 358 can update QP table 360 with a revised transmit rate for a QP.

Receive side scaling (RSS) 362 can provide distribution of received packets for processing by multiple CPUs or cores (not shown) using RSS. RSS 362 can involve calculation of a hash based on contents of a received packet to determine which CPU or core is to process a packet. Interrupt moderation 366 can be used to perform interrupt moderation whereby network interface interrupt moderation 366 waits for multiple packets to arrive, or for a time-out to expire, before generating an interrupt to host system to process received packet(s). Receive Segment Coalescing (RSC) can be performed by network interface whereby portions of incoming packets are combined into segments of a packet. Network interface can store the coalesced packet in memory.

Direct memory access (DMA) engine 368 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Processors 390 can be any a combination of a: processor, core, graphics processing unit (GPU), field programmable gate array (FPGA), application specific integrated circuit (ASIC), or other programmable hardware device that allow programming of network interface. For example, processors 390 can provide for identification of a resource to use to perform a workload and generation of a bitstream for execution on the selected resource. For example, a "smart network interface" can provide packet processing capabilities in the network interface using processors 390. For example, packet processing capabilities can include cryptography (encryption, decryption, public key encryption (PKE), or private key encryption or decryption), data compression (DC), cipher, header processing, authentication capabilities, or other services.

Memory 392 can be any type of volatile or non-volatile memory device and can store any queue or instructions used to program network interface. Transmit queue 382 can include data or references to data stored in memory for transmission by network interface. Receive queue 364 can include data or references to data that was received by network interface from a network and stored in memory. Descriptor queues 394 can include descriptors that reference data or packets in transmit queue 382 or receive queue 364 and corresponding destination memory regions.

Bus interface 370 can provide an interface with a host device (not depicted). For example, bus interface 370 can be compatible with PCI, PCI Express, PCI-x, Serial ATA, and/or USB compatible interface (although other interconnection standards may be used).

Figure 4A:
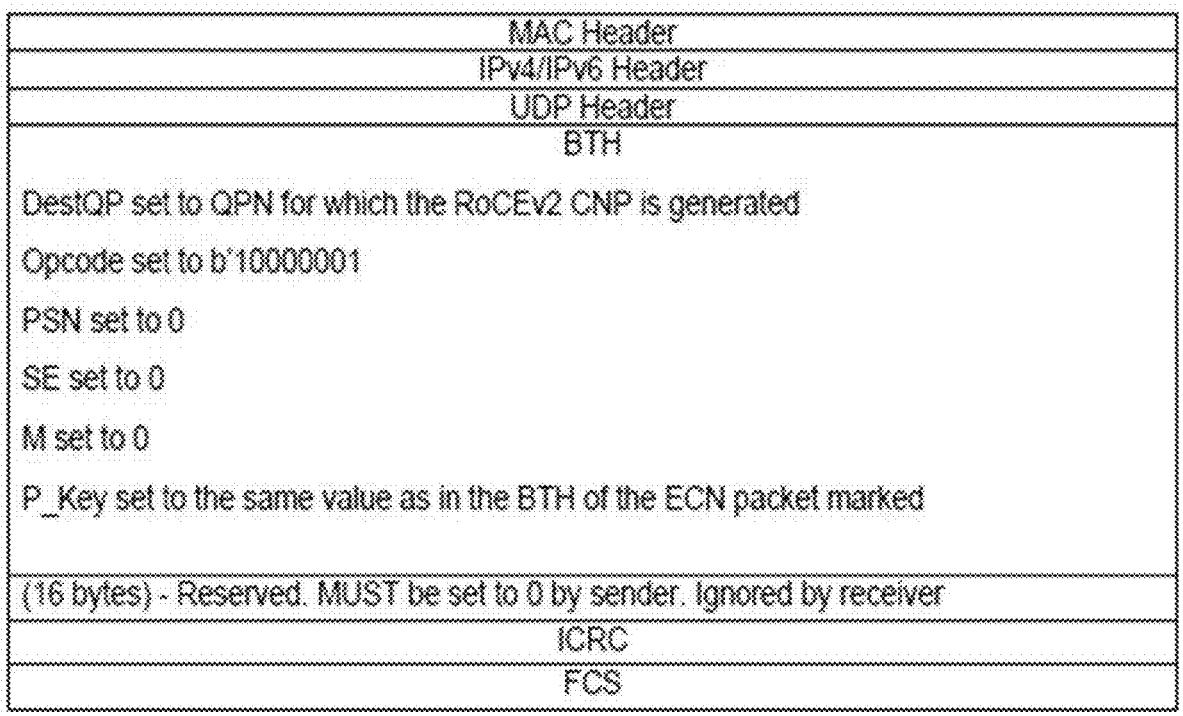
FIG. 4A provides an example packet format.

FIG. 4A provides an RoCEv2 CNP packet format as described in the standard Annex A17: RoCEv2, section 17.9.3 (2014). Example fields of a Base Transport Header (BTH) of an RoCEv2 compatible packet is below.

| Field | Size (in bits) | Example Description |
|---|---|---|
| OpCode | 8 | Indicates the IBA packet type. Indicates packet is type CNP. The OpCode also specifies which extension headers follow the Base Transport Header |
| Solicited Event (SE) | 1 | Indicates that an event should be generated by the responder |
| MigReq (M) | 1 | Used to communicate migration state |
| Pad Count (PadCnt) | 2 | Indicates how many extra bytes are added to the payload to align to a 4 byte boundary |
| Transport Header Version (TVer) | 4 | Indicates the version of the IBA Transport Headers. |
| Partition Key (P_KEY) | 16 | Indicates which logical Partition is associated with this packet |
| F/Res1* (F/R) | 1 | F (FECN): 0 indicates that a FECN indication was not received 1 indicates that the packet went through a point of congestion Res1*: Transmitted as 0, ignored on receive. This field is not included in the invariant CRC. |
| B/Res1* (B/R) | 1 | B (BECN): 0 the packet did not go through a point of congestion or went through a point of congestion but was not marked 1 indicates that the packet indicated by this header was subject to forward congestion. The B bit is set in an ACK or CN BTH Res1*: Transmitted as 0, ignored on receive. This field is not included in the invariant CRC. see 7.8 CRCs on page 207 for details. |

-continued

| Field | Size (in bits) | Example Description |
| --- | --- | --- |
| Reserved (variant) | 6 | Transmitted as 0, ignored on receive. This field is not included in the invariant CRC. |
| Destination QP (DestQP) | 24 | Indicates the Work Queue Pair (QP) Number at the destination. |
| Acknowledge Request (A) | 1 | Used to indicate that an acknowledge (for this packet) should be scheduled by the responder. |
| Reserved | 7 | Transmitted as 0, ignored on receive. This field is included in the invariant CRC. |
| Packet SequenceNumber (PSN) | 24 | Used to detect a missing or duplicate Packet. |
| Padding | 16 | All zeros |
| iCRC | 4 | iCRC checksum |

Figure 4B:
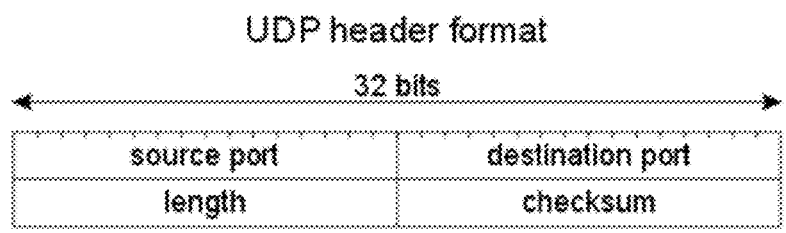
FIG. 4B depicts an example packet header.

FIG. 4B depicts an example UDP header from RFC 768 (1980). In this example, a source port field can be 16 bits. According to some embodiments, the source port field can be used to convey a source queue pair identifier from a transmitter. In response to detection of congestion, the source port field can be used to convey a source queue pair identifier to a transmitter of a congestion causing packet(s). A source queue pair identifier can be 16 bits or smaller or larger number of bits.

Figure 4C:
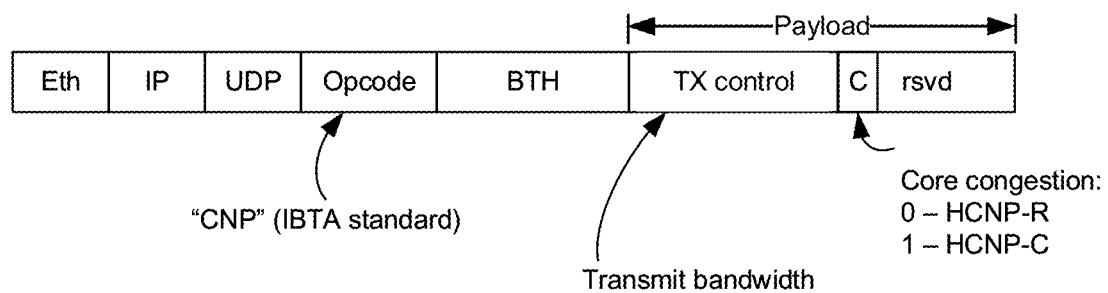
FIG. 4C depicts an example packet.

FIG. 4C depicts an example packet. The packet can include an Ethernet (Eth) header, Internet Protocol (IP) header, UDP header, an Opcode, BTH, and a payload. The payload can include transmit (TX) control and reserved (rsvd) bits or bytes. In some embodiments, UDP (or TCP) header can include a source port field that can be used to convey at least a source QP identifier. In some embodiments, reserved bytes or bits of a RoCEv2 CNP packet can be used to convey a source QP identifier. For example, any of reserved 16 bytes can be used to identify a source QP identifier. In some embodiments, a source QP identifier can be truncated or encoded and a receiver can decode the source QP identifier using a decoding scheme. In some embodiments, an IPv4 Options field, or an IPv6 Extended Header field may convey the source QP identifier. A CNP can have the same BTH:Opcode encoding as the standard RoCEv2 CNP packet but differ in CNP payload by including a requested transmission interpacket gap indication (e.g., 8 bits).

TX control field can specify an inter-packet transmit gap to convey a time between transmitting packets and can control a bit transmit rate for a transmitter to apply for transmissions using a QP. Inter-packet gap can indicate a time between transmission of consecutive packets (e.g., time between transmission of an end of a first packet and beginning of transmission of a next packet). Inter-packet gap can express a time period between transmission of one packet and a transmission of a next packet. An inter-packet gap value and a multiplier can be provided where the transmitter determines the inter-packet gap value times the multiplier to determine a time between transmission of an end of a first packet and transmission of a start of a second packet.

In addition or alternatively, TX control field can be a specified bit transmit rate for a transmitter to apply for transmissions using a QP.

In addition or alternatively, TX control field can specify outstanding data in flight. A transmitter can be limited in terms of outstanding bit/byte count per QP that is in-flight. TX control field can indicate total amount of outstanding bits or bytes an endpoint transmitter is permitted to have in-flight. Inter-packet transmit gap, bit transmit rate, or outstanding data in flight can be raised, remain the same, or lowered for a QP.

Figure 5A:
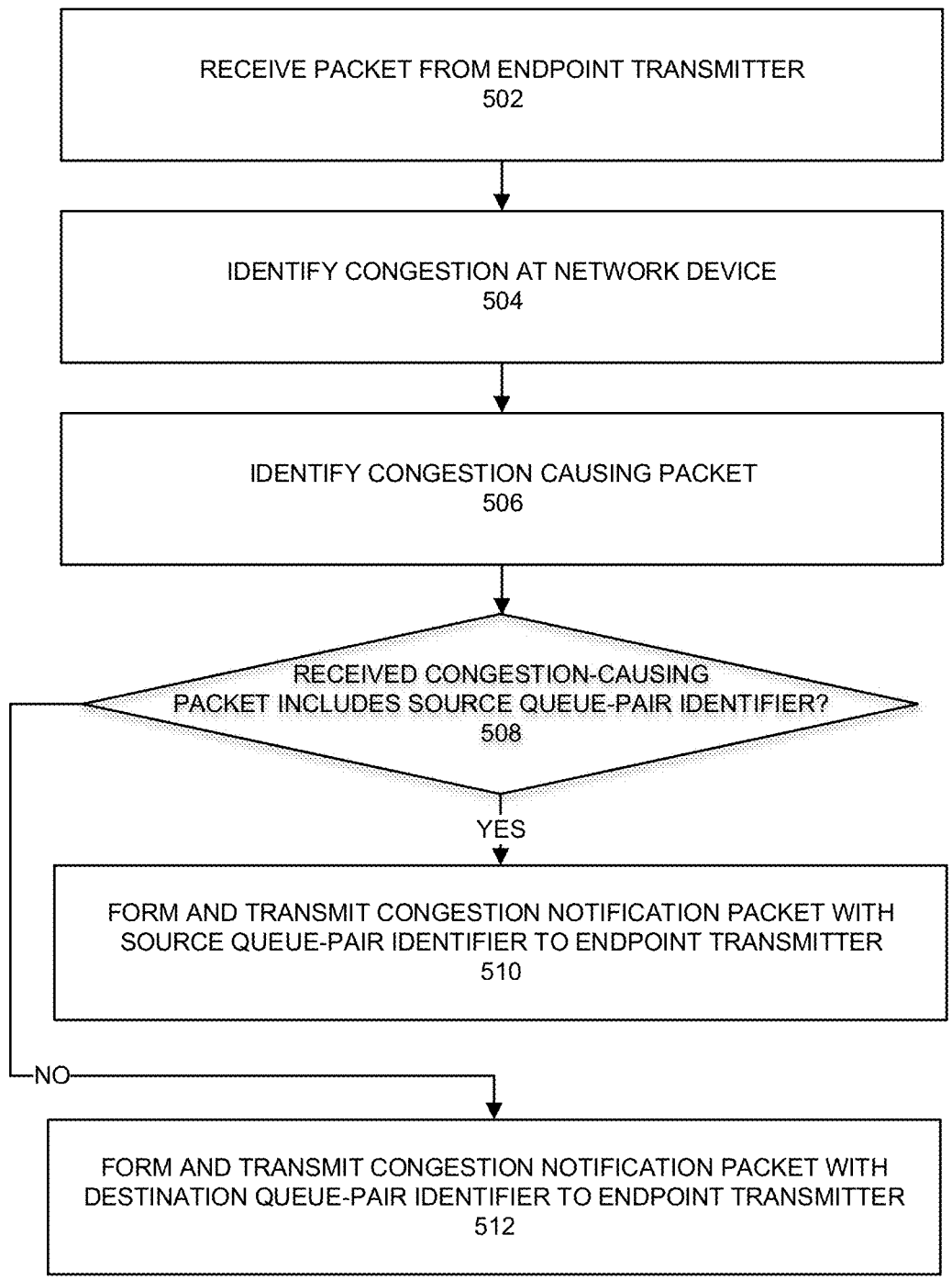
FIG. 5A depicts an example process that can be used by a network device to determine a queue pair associated with detected congestion.

FIG. 5A depicts an example process that can be used by a network device to determine a source queue pair associated with detected congestion. At 502, packet can be received from an endpoint transmitter. For example, the received packet can be a RoCEv2 compatible packet and the packet's UDP source port field can include a source queue-pair identifier. At 504, congestion at a network device can be identified. The network device can be at least any of a core switch, edge switch, or endpoint receiver. For example, congestion can be identified if an ingress queue or an egress queue of a network device has a fill level that is too high (e.g., at or above a threshold). At 506, the congestion causing packet received at the network device can be identified. For example, a congestion-causing packet can be a packet that caused a fill level of a queue to meet or exceed a threshold. In some examples, the congestion-causing packet can cause one or more of: overflow of packets at an ingress port, overflow of packets at an ingress queue, overflow of packets at an egress queue, overflow of packets at an egress port, incast level exceeding a threshold (e.g., more traffic to egress port than egress port can handle), packet drop rate in a transmit pipeline such as egress queues or intermediate queues that feed egress queues, bandwidth limits, queue depth exceeded.

At 508, a determination is made as to whether a received congestion-causing packet includes a source queue-paid identifier. If the received congestion-causing packet includes a source queue-paid identifier, 510 follows. If the received congestion-causing packet does not include a source queue-paid identifier, 512 follows.

At 510, a congestion notification packet with source queue-pair identifier can be formed and transmitted to an endpoint transmitter. For example, the congestion-causing packet can be a RoCEv2 compatible packet and the UDP source port field or TCP source port field that conveys a source QP identifier. A CNP can be formed to include the source QP identifier copied from the congestion-causing packet. The QP identifier can be placed in a UDP source port field or TCP source port field of the CNP.

Note that in other examples, if the congestion causing packet does not include a source queue-pair identifier, the network device that experiences congestion can determine a source queue-pair identifier from a lookup table and provide the source queue-pair identifier in the CNP.

At 512, a congestion notification packet with destination queue-pair identifier can be formed and transmitted to an endpoint transmitter. The destination queue-pair identifier can be copied from the congestion-causing packet. Any other information from the congestion causing packet can be copied and provided in the congestion notification packet including any of Ethernet type field, source and/or destination IP address, source and/or destination User Datagram Protocol (UDP) ports, source/destination TCP ports, or any other header field.

Figure 5B:
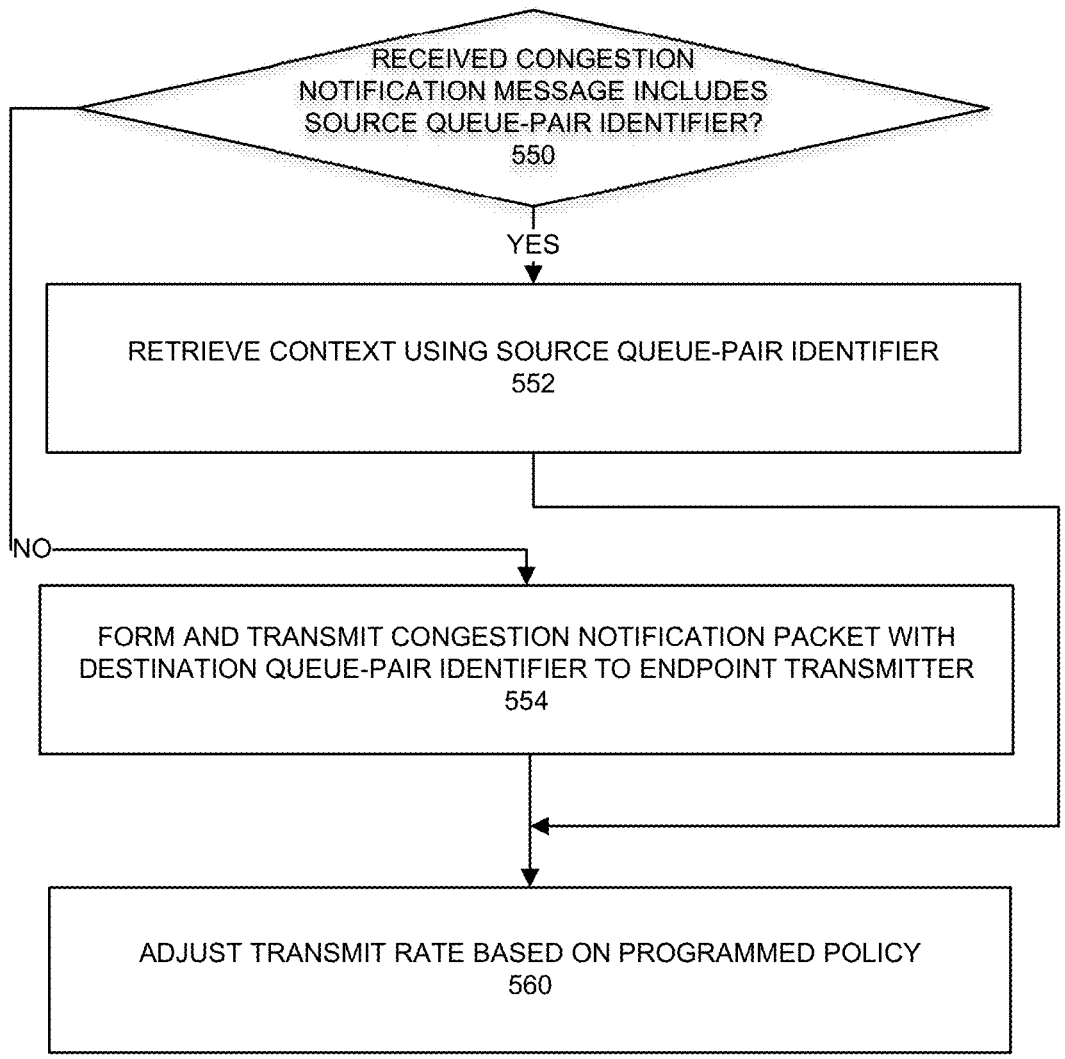
FIG. 5B depicts an example process that can be used at a network device based on receipt of a queue pair identifier.

FIG. 5B depicts an example process that can be used at a network device based on receipt of a QP identifier. At 550, the endpoint transmitter determines if a received congestion notification message includes an identification of a source queue-pair identifier. For example, the received congestion notification message can be a CNP. If the received congestion notification message includes an identification of a source queue-pair identifier, then 552 follows. If the received congestion notification message does not include an identification of a source queue-pair identifier, then 554 follows.

At 552, the endpoint transmitter can look-up a transmit context using the source QP identifier provided in the congestion notification message. The transmit context can include one or more of: a transmit bit rate, explicit bit rate (Mbps), inter-packet gap (gap between transmitted packets), transmit packet sequence number, receive packet sequence number, and other values. The process can continue to 560.

At 554, the endpoint transmitter can perform a look-up of a transmit context from information provided in the congestion notification message. For example, a congestion notification message can include a destination QP identifier, source or destination addresses, and other information. Any of the information in the congestion notification message can be used to lookup a transmit context for a congested QP. The process can continue to 560.

At 560, the endpoint transmitter can adjust a transmit rate based on its programmed policy to react to receipt of a CNP (e.g., decrease transmit rate or increase transmit rate).

Figure 6:
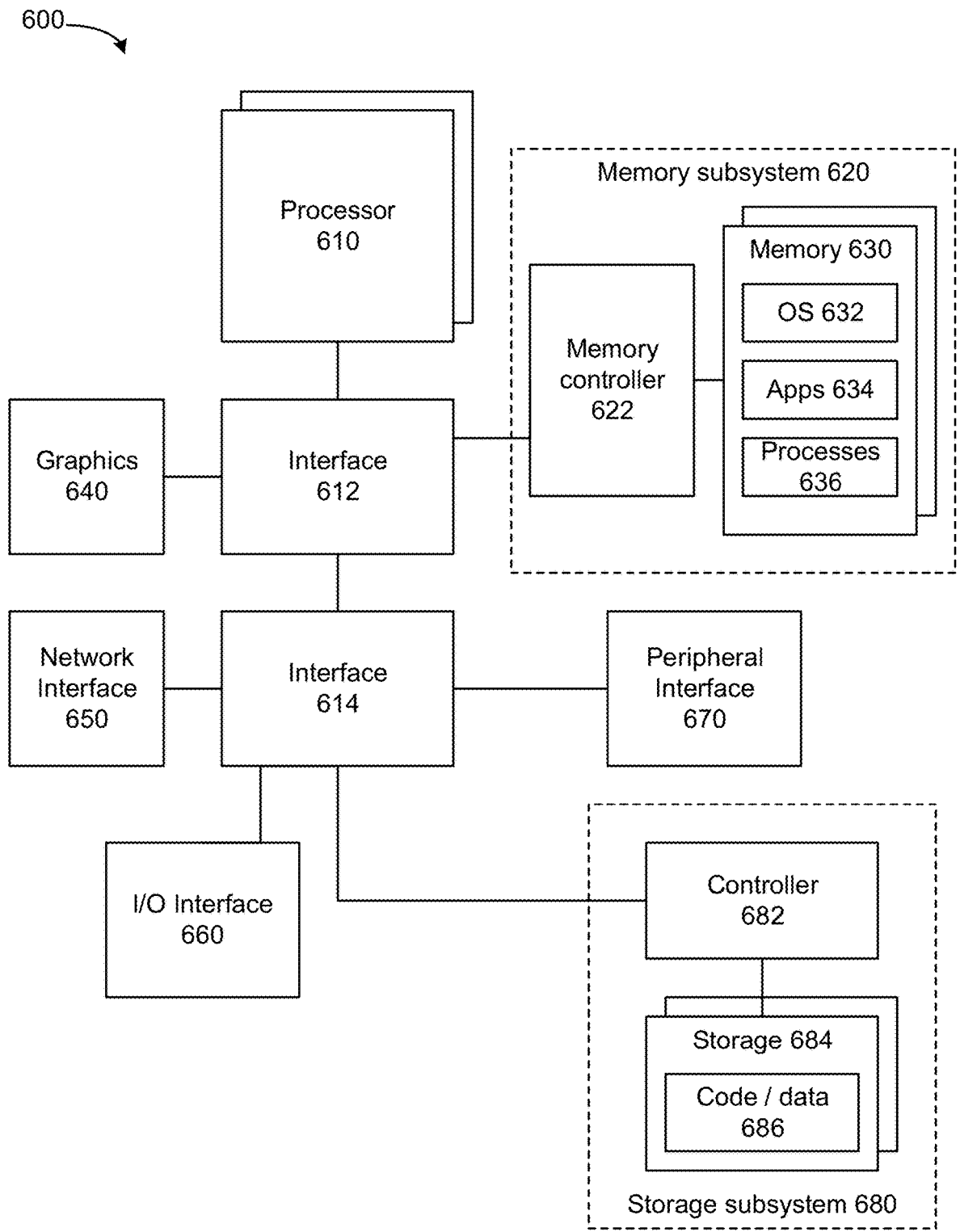
FIG. 6 depicts a system.

FIG. 6 depicts a system. The system can use embodiments described herein System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include stand-alone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a non-volatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 7:
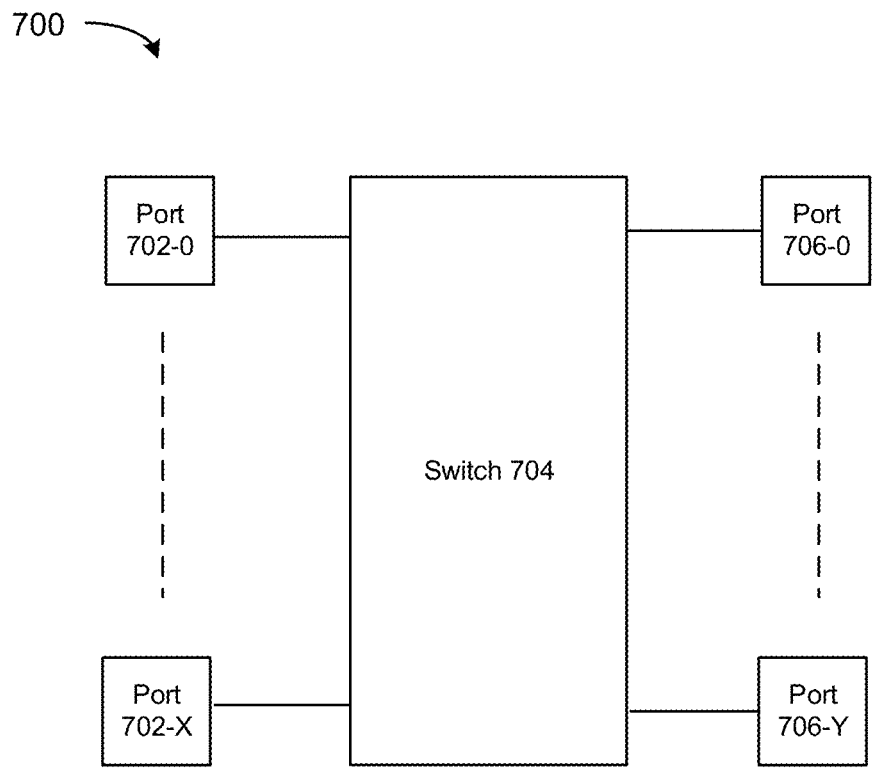
FIG. 7 depicts a switch.

FIG. 7 depicts a switch. Various embodiments can be used in or with the switch of FIG. 7. Switch 704 can route packets or frames of any format or in accordance with any specification from any port 702-0 to 702-X to any of ports 706-0 to 706-Y (or vice versa). Any of ports 702-0 to 702-X can be connected to a network of one or more interconnected devices. Similarly, any of ports 706-0 to 706-X can be connected to a network of one or more interconnected devices. Switch 704 can decide which port to transfer packets or frames to using a table that maps packet characteristics with an associated output port. In addition, switch 704 can perform packet replication for forwarding of a packet or frame to multiple ports and queuing of packets or frames prior to transfer to an output port. In some cases, switch 704 drops packets. Switch 704 can be configured to monitor for congestion and information a source transmitter of congestion causing packets to adjust its transmit rate of the congestion causing queue-pair.

Figure 8:
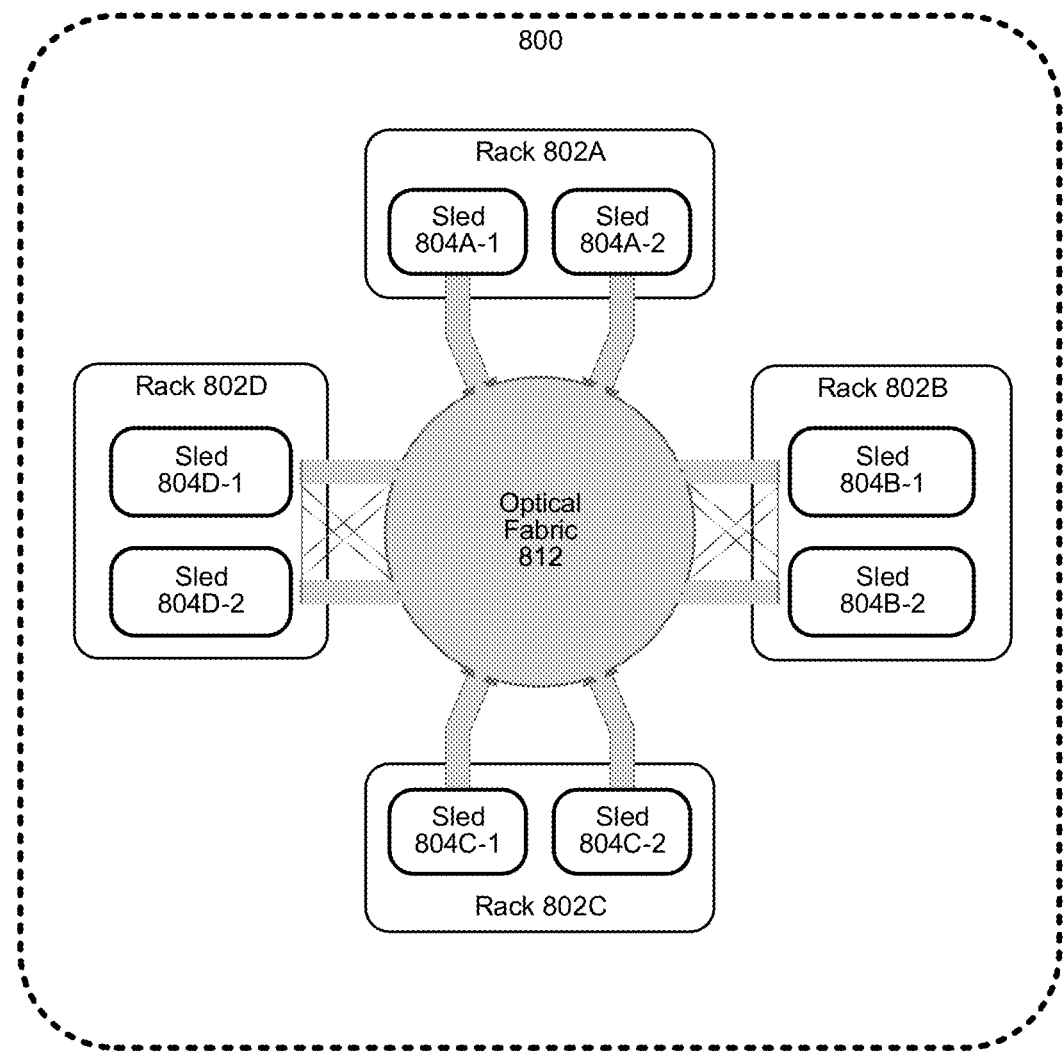
FIG. 8 depicts an example of a data center.

FIG. 8 depicts an example of a data center. Various embodiments can be used in or with the data center of FIG. 8. As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) the other sleds in data center 800. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide sled signaling connectivity with one or more of the seven other sleds. For example, via optical fabric 812, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores"

may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a network device comprising: a memory device and a congestion monitor device coupled to the memory device, the congestion monitor device to: access a congestion causing packet and based on the congestion causing packet including a source queue-pair identifier: copy the source queue-pair identifier from the congestion causing packet, form a congestion notification packet (CNP) that includes a copy of the source queue-pair identifier, and cause the CNP to be transmitted to a transmitter of the congestion causing packet.

Example 2 includes any example, wherein the congestion monitor device is to: based on the congestion causing packet not including a source queue-pair identifier: perform lookup of source queue-pair identifier for the congestion causing packet, form a congestion notification packet (CNP), the CNP comprising the source queue-pair identifier from the lookup, and cause the CNP including the source queue-pair identifier from the lookup to be transmitted to a transmitter of the congestion causing packet.

Example 3 includes any example, wherein the CNP is compatible with RDMA over Converged Ethernet (RoCE) v2.

Example 4 includes any example, wherein the congestion causing packet includes a User Datagram Protocol (UDP) source port field that includes the source queue-pair identifier.

Example 5 includes any example, wherein the congestion causing packet includes a Transmission Control Protocol (TCP) source port field that includes the source queue-pair identifier.

Example 6 includes any example, wherein the CNP comprises a User Datagram Protocol (UDP) source port field that includes the source queue-pair identifier.

Example 7 includes any example, wherein the CNP comprises a Transmission Control Protocol (TCP) source port field that includes the source queue-pair identifier.

Example 8 includes any example, wherein the congestion monitor device is to: provide an inter-packet gap in the CNP.

Example 9 includes any example and including a switch or an endpoint receiver.

Example 10 includes any example and including a switch or an end point receiver in a compute sled, rack, server, or data center.

Example 11 includes a computer-implemented method comprising: forming a packet for transmission, the packet comprising a source queue-pair identifier; receiving a congestion notification packet (CNP), the CNP comprising the source queue-pair identifier; identifying a transmit context based on the received source queue-pair identifier independent from a lookup of a source queue-pair identifier based on content of the received CNP; and adjusting a transmit rate of packets in response to receipt of the CNP.

Example 12 includes any example, wherein the CNP is compatible with RDMA over Converged Ethernet (RoCE) v2.

Example 13 includes any example, wherein the CNP comprises a User Datagram Protocol (UDP) compatible source port field that includes the source queue-pair identifier.

Example 14 includes any example, wherein the CNP comprises a Transmission Control Protocol (TCP) source port field that includes the source queue-pair identifier.

Example 15 includes any example, wherein the packet comprises a User Datagram Protocol (UDP) compatible source port field that includes the source queue-pair identifier.

Example 16 includes any example, wherein the packet comprises a Transmission Control Protocol (TCP) source port field that includes the source queue-pair identifier.

Example 17 includes any example, wherein the CNP includes an inter-packet gap and wherein adjusting a transmit rate of packets in response to receipt of the CNP comprises adjusting the transmit rate based on the inter-packet gap.

Example 18 includes a system comprising: a computing system comprising at least one processor and at least one memory; and a network interface communicatively coupled to the computing system, the network interface comprising: a congestion monitor device to: receive a congestion notification packet (CNP), the CNP comprising a source queue-pair identifier and transmit rate indicator; access a context for the queue-pair based on the received source queue-pair identifier; and adjust a transmit rate associated with packets in the queue-pair based on the transmit rate indicator in the CNP.

Example 19 includes any example, wherein the transmit rate indicator comprises an inter-packet gap associated with the queue-pair identifier.

Example 20 includes any example, wherein the congestion monitor device is to adjust a transmit rate in the context associated with the queue-pair identifier.

Example 21 includes any example, wherein the CNP comprises a field that includes the source queue-pair identifier, the field comprises one or more of: User Datagram Protocol (UDP) compatible source port, Transmission Control Protocol (TCP) source port field, or a preamble.

What is claimed is:

1. A network device comprising:
   a memory device and
   a congestion monitor device coupled to the memory device, the congestion monitor device to:
   access a received congestion causing packet and
   based on the received congestion causing packet including a source queue-pair identifier:
     copy the source queue-pair identifier from the received congestion causing packet,
     form a congestion notification packet (CNP) that includes a copy of the source queue-pair identifier from the received congestion causing packet, and
     cause the CNP to be transmitted to a transmitter of the received congestion causing packet.

2. The network device of claim 1, wherein the congestion monitor device is to:
   determine whether the received congestion causing packet includes a source queue-pair identifier and
   based on the received congestion causing packet not including a source queue-pair identifier:
     perform lookup of source queue-pair identifier for the congestion causing packet, form a congestion notification packet (CNP), the CNP comprising the source queue-pair identifier from the lookup, and
     cause the CNP including the source queue-pair identifier from the lookup to be transmitted to a transmitter of the congestion causing packet.

3. The network device of claim 1, wherein the CNP is compatible with RDMA over Converged Ethernet (RoCE) v2.

4. The network device of claim 1, wherein the received congestion causing packet includes a User Datagram Protocol (UDP) source port field that includes the source queue-pair identifier.

5. The network device of claim 1, wherein the received congestion causing packet includes a Transmission Control Protocol (TCP) source port field that includes the source queue-pair identifier.

6. The network device of claim 1, wherein the CNP comprises a User Datagram Protocol (UDP) source port field that includes the source queue-pair identifier.

7. The network device of claim 1, wherein the CNP comprises a Transmission Control Protocol (TCP) source port field that includes the source queue-pair identifier.

8. The network device of claim 1, wherein the congestion monitor device is to:
   provide an inter-packet gap in the CNP.

9. The network device of claim 1, comprising a switch or an endpoint receiver.

10. The network device of claim 1, comprising a switch or an end point receiver in a compute sled, rack, server, or data center.

11. A computer-implemented method comprising:
    forming a packet for transmission, the packet comprising a source queue-pair identifier;
    receiving a congestion notification packet (CNP), the CNP comprising the source queue-pair identifier and the source queue-pair identifier being a copy of a source queue-pair identifier in a packet associated with congestion in a sender of the CNP;
    identifying a transmit context based on the source queue-pair identifier in the received CNP independent from a lookup of a source queue-pair identifier based on the source queue-pair identifier being present in the received CNP; and
    adjusting a transmit rate of packets in response to receipt of the CNP.

12. The method of claim 11, wherein the CNP is compatible with RDMA over Converged Ethernet (RoCE) v2.

13. The method of claim 11, wherein the CNP comprises a User Datagram Protocol (UDP) compatible source port field that includes the source queue-pair identifier.

14. The method of claim 11, wherein the CNP comprises a Transmission Control Protocol (TCP) source port field that includes the source queue-pair identifier.

15. The method of claim 11, wherein the packet comprises a User Datagram Protocol (UDP) compatible source port field that includes the source queue-pair identifier.

16. The method of claim 11, wherein the packet comprises a Transmission Control Protocol (TCP) source port field that includes the source queue-pair identifier.

17. The method of claim 11, wherein the CNP includes an inter-packet gap and wherein adjusting a transmit rate of packets in response to receipt of the CNP comprises adjusting the transmit rate based on the inter-packet gap.

18. A system comprising:
    a computing system comprising at least one processor and at least one memory; and
    a network interface communicatively coupled to the computing system, the network interface comprising:
    a congestion monitor device to:
      receive a congestion notification packet (CNP), the CNP comprising a source queue-pair identifier and transmit rate indicator, wherein the source queue-pair identifier is a copy of a source queue-pair identifier in a packet that is associated with congestion experienced at a sender of the CNP;
      access a context for a queue-pair based on the source queue-pair identifier in the received CNP; and
      adjust a transmit rate associated with packets in the queue-pair associated with the source queue-pair identifier based on the transmit rate indicator in the CNP.

19. The system of claim 18, wherein the transmit rate indicator comprises an inter-packet gap associated with the source queue-pair identifier.

20. The system of claim 18, wherein the congestion monitor device is to adjust a transmit rate identified in the context associated with the source queue-pair identifier.

21. The system of claim 18, wherein the CNP comprises a field that includes the source queue-pair identifier, the field comprises one or more of: User Datagram Protocol (UDP) compatible source port, Transmission Control Protocol (TCP) source port field, or a preamble.

* * * * *

UNITED STATES PATENT AND TRADEMARK OFFICE
CERTIFICATE OF CORRECTION

PATENT NO. : 10,944,660 B2
APPLICATION NO. : 16/517408
DATED : March 9, 2021
INVENTOR(S) : Simoni Ben-Michael, Tony Hurson and Ben-Zion Friedman It is certified that error appears in the above-identified patent and that said Letters Patent is hereby corrected as shown below:

On the Title Page

Item (12) "Hurson et al." should read:
-- Ben-Michael et al. --.

Please update "(72) Inventors" to read:
-- Simoni Ben-Michael, Givat Zeev (IL); Tony Hurson, Austin, TX (US); Ben-Zion Friedman, Jerusalem (IL) --.

Signed and Sealed this
Fifth Day of July, 2022

Katherine Kelly Vidal
*Director of the United States Patent and Trademark Office*